(12) United States Patent
Charrier et al.

(10) Patent No.: US 11,698,128 B2
(45) Date of Patent: Jul. 11, 2023

(54) LUBRICATING LIQUID MANIFOLD FOR A CRANKPIN OF AN EPICYCLIC GEAR TRAIN, GEARBOX AND AIRCRAFT

(71) Applicant: AIRBUS HELICOPTERS, Marignane (FR)

(72) Inventors: Mathieu Charrier, Marseilles (FR); Jerome Belmonte, Aix en Provence (FR); Adrien Escoffier, Saint-Cannat (FR); Sebastien Robert, Septemes les Vallons (FR); Maxime Maltinti, Chateauneuf les Martigues (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/967,133

(22) Filed: Oct. 17, 2022

(65) Prior Publication Data

US 2023/0167896 A1    Jun. 1, 2023

(30) Foreign Application Priority Data

Nov. 30, 2021 (FR) ...................................... 2112701

(51) Int. Cl.
  *F16H 57/04* (2010.01)
  *B64C 27/12* (2006.01)

(52) U.S. Cl.
  CPC ......... *F16H 57/0479* (2013.01); *B64C 27/12* (2013.01); *F16H 57/0423* (2013.01); *F16H 57/0443* (2013.01); *F16H 57/0482* (2013.01)

(58) Field of Classification Search
  CPC ............. F16H 57/0479; F16H 57/0423; F16H 57/0443; F16H 57/0482; B64C 27/12
  (Continued)

(56) References Cited

U.S. PATENT DOCUMENTS 4,271,928 A * 6/1981 Northern ............... F16C 33/103
                                                 184/6.12
2016/0290480 A1   10/2016 Sada et al.
(Continued)

FOREIGN PATENT DOCUMENTS

DE   102012217307 A1   5/2014
EP       3964734 A1   3/2022
FR       3098562 A1   1/2021

OTHER PUBLICATIONS

French Search Report for French Application No. FR2112701, Completed by the French Patent Office, dated Jun. 23, 2022, 9 pages.

*Primary Examiner* — Colby M Hansen
(74) *Attorney, Agent, or Firm* — Brooks Kushman P.C.

(57) ABSTRACT

A lubricating liquid manifold for a crankpin of an epicyclic gear train. The epicyclic gear train is lubricated by a lubrication system conveying a first flow of a lubricating liquid towards the manifold and a second flow of the lubricating liquid towards a member to be lubricated. The manifold comprises a hollow body provided with an inlet port intended to receive the first flow and an outlet port designed such that the first flow is conveyed towards a guide device connected to the crankpin. The manifold comprises a barrier comprising a shoulder connected to the body and a deflector protruding radially outwards from the body so as to form, with the shoulder, a diversion space for diverting the second flow and preventing it from penetrating into the manifold.

15 Claims, 6 Drawing Sheets

(58) Field of Classification Search
USPC .......................................................... 475/159
See application file for complete search history.

(56) References Cited

U.S. PATENT DOCUMENTS

| | | | |
|---|---|---|---|
| 2018/0087650 A1* | 3/2018 | Poster | F16H 57/0482 |
| 2018/0258794 A1 | 9/2018 | Gedin et al. | |
| 2021/0010585 A1 | 1/2021 | Dombek et al. | |

* cited by examiner

LUBRICATING LIQUID MANIFOLD FOR A CRANKPIN OF AN EPICYCLIC GEAR TRAIN, GEARBOX AND AIRCRAFT

CROSS REFERENCE TO RELATED APPLICATIONS

This application claims priority to French patent application No. FR 2112701 filed on Nov. 30, 2021, the disclosure of which is incorporated in its entirety by reference herein.

TECHNICAL FIELD

The present disclosure lies in the field of lubrication of gear systems, and in particular gearboxes of a rotary-wing aircraft. The present disclosure relates to a lubricating liquid manifold for a crankpin of an epicyclic gear train. The present disclosure also relates to an epicyclic gear train equipped with such a manifold, a gearbox provided with such an epicyclic gear train and an aircraft provided with such a gearbox.

BACKGROUND

An epicyclic gear train makes it possible to provide a high rotational speed reduction ratio between an input shaft and an output shaft. An epicyclic gear train may be a component of a mechanical system such as, for example, a transmission of a vehicle, in particular of an aircraft.

An epicyclic gear train may comprise a toothed sun gear, a toothed outer ring gear, a planet carrier and several toothed wheels forming planet gears that are carried by the planet carrier. The teeth of the planet gears mesh both with teeth of the sun gear and with teeth of the outer ring gear. Depending on the use of the epicyclic gear train, the sun gear, the planet carrier or the outer ring gear are secured to the input shaft or the output shaft. For example, the outer ring gear is fixed, the sun gear being secured to the input shaft and the planet carrier being secured to the output shaft.

The planet carrier may comprise a support carrying crankpins. The crankpins and the support may form one and the same part or indeed the crankpins may be attached and fastened rigidly to the support.

An epicyclic gear train also comprises rotational guide devices for guiding the rotation of the different rotating elements, for example the sun gear, the planet carrier and the planet gears. A rotational guide device may, for example, comprise a plain bearing or one or more bearings with rolling elements, such as ball bearings, roller bearings or indeed needle bearings. A rotational guide device comprises, for example, an inner ring, an outer ring and rolling elements arranged between the inner ring and the outer ring. For reasons of simplification, such a rotational guide device is referred to hereinafter more simply as "guide device".

An epicyclic gear train is generally lubricated by a lubrication system in order to limit, in particular, the heating and wear of the toothed elements and the guide devices and, therefore, ensure the correct operation of the epicyclic gear train and extend its service life. In particular, this lubrication system conveys a lubricating liquid to the zones and the elements to be lubricated, in particular the toothed elements and the guide devices. This lubrication also helps remove any metal particles that may result from the normal wear or degradation of an element of the epicyclic gear train.

The architecture of an epicyclic gear train and its operation often require lubrication of the guide devices guiding the planet gears, for example from an inner ring by centrifugal effect. The lubricating liquid may, for example, be conveyed into each crankpin supporting a planet gear, and is then pressurized by centrifugal force to flow through the inner ring in order to lubricate the rolling elements of the guide device guiding this planet gear.

However, under the effect of high rotational speeds of the planet carrier and depending on the geometry of the crankpin, some of the lubricating liquid may flow back out of the crankpin.

Moreover, when a guide device is situated higher than the planet gears, for example a guide device guiding the planet carrier, a flow of lubricating liquid may flow through it by force of gravity, and may possibly then reach the guide devices guiding the planet gears. This lubricating liquid is then likely to be polluted before reaching the guide devices guiding the planet gears.

Additionally, another flow of lubricating liquid may be conveyed directly to the crankpins from sprinklers or nozzles that are fixed in relation to the frame of the mechanical system. In this case, a deflector may be integrated above the guide devices guiding the planet gears in the epicyclic gear train in order to direct this flow of lubricating liquid towards the guide devices guiding the planet gears and also limit the quantity of lubricating liquid used.

An epicyclic train may also comprise a bowl intended to supply lubricating liquid to the bearings and gears, as described in document US 2018/0258794. The lubricating liquid originates from a single fixed sprinkling means. The bowl is secured to the planet carrier and is annular in shape around an axis of rotation of the planet carrier. The bowl comprises a circumferential series of cups separated by walls and connected respectively to pipes of different lengths and arranged radially. The pipes thus allow lubricating liquid to be supplied to the bearings of the planet gears and to the teeth of the planet gears, the outer ring gear or the sun gear. The lubricating liquid can pass from one cup to an adjacent cup when the quantity of lubricating liquid exceeds the height of the walls of the cup.

The technological background of the disclosure includes documents DE 10 2012 217307, US 2016/0290480, FR 3098562 and EP 3964734.

SUMMARY

The aim of the present disclosure is therefore to propose a lubricating liquid manifold for a crankpin of an epicyclic gear train that aims, in particular, to prevent two separate flows of a lubricating liquid from mixing, in order to prevent lubricating liquid from circulating successively in several rotational guide devices.

The object of the present disclosure is, for example, a lubricating liquid manifold for a crankpin, the crankpin being configured to carry a rotational guide device. This crankpin may, for example, be arranged on a planet carrier of an epicyclic train and may carry a rotational guide device, such as a plain bearing, a ball bearing or a roller bearing, of a planet gear.

The manifold is configured to receive a first flow and a second flow of a lubricating liquid, the first flow and the second flow being separate.

The lubricating liquid manifold according to the disclosure is remarkable in that it comprises:

a hollow body around a geometric axis AX and provided with:
   an inlet port configured to receive the first flow of the lubricating liquid; and an outlet port adapted and configured such that the first flow is conveyed towards a guide device connected to the crankpin, a barrier configured to divert a second flow of the lubricating liquid, the barrier comprising:

a shoulder connected to the hollow body and provided with a bearing face, the bearing face extending in a bearing plane;

deflector situated on an opposite side to the outlet port in relation to the bearing plane, the deflector protruding radially outwards from the hollow body, locally, moving away from the geometric axis AX; and a diversion space for diverting the second flow situated between the deflector and the bearing plane.

The lubricating liquid manifold according to the disclosure is intended to be arranged in a crankpin, for example a crankpin of a lubricated mechanical system, and in particular of an epicyclic gear train.

The hollow body of the manifold may have a shape that matches the internal shape of the crankpin. The hollow body is, for example, at least partially cylindrical with a circular base in order to be arranged in a crankpin whose internal shape is also cylindrical with a circular base.

A first flow of the lubricating liquid is conveyed, for example by injection or spraying, towards the inlet port of the liquid manifold by means of a spraying device for spraying the lubricating liquid, such as a port, a sprinkler, a nozzle or any equivalent means, in order to at least partially fill the manifold with the lubricating liquid. The lubricating liquid is conveyed, for example by force of gravity, and possibly under the effect of a centrifugal force if the crankpin is rotating, into a lower region of the crankpin, via the outlet port. The crankpin may comprise one or more radial ports in one of its walls so that the first flow of the lubricating liquid is then conveyed towards a member to be lubricated and/or to be cooled, such as a rotational guide device, for example positioned around the crankpin.

The first flow arriving directly from a spraying device for spraying the lubricating liquid is clean and unpolluted. However, a second flow of the lubricating liquid may have been used to lubricate and/or cool another member. This second flow may therefore, for example, have been heated and therefore be less effective for lubricating and/or cooling a member. This second flow may also be polluted.

The bearing face of the shoulder is configured to bear against an outer face of the crankpin or indeed against an outer face of a support carrying the crankpin. The bearing face of the shoulder thus prevents the second flow of the lubricating liquid, or at the very least foreign particles that it comprises, from penetrating into the crankpin where this bearing face meets an outer face of the crankpin or indeed an outer face of a support carrying the crankpin.

The deflector is a face of the barrier that protrudes at least radially outwards and at the periphery of the hollow body, so as to delimit a diversion space with the bearing plane and the shoulder or indeed a part of the hollow body. This diversion space is open radially to the outside of the manifold, moving away from the geometric axis AX. The term "radially" should be understood in relation to the geometric axis AX. This diversion space is intended to accumulate and direct around the manifold the second flow of the lubricating liquid which is separate from the first flow.

The barrier thus channels and diverts the second flow and also prevents the second flow from penetrating into the hollow body of the manifold. The second flow of the lubricating liquid may thus be discharged, without circulating through the manifold according to the disclosure, or subsequently through the member to be lubricated and/or to be cooled.

The lubricating liquid manifold according to the disclosure therefore advantageously helps to prevent the first and the second flow of lubricating liquid from mixing and therefore to prevent a flow of clean lubricating liquid from mixing with a flow that may have been polluted or heated. The lubricating liquid manifold according to the disclosure also allows the second flow to be discharged without entering the manifold.

The lubricating liquid manifold according to the disclosure may comprise one or more of the following features, taken individually or in combination.

According to one example, the deflector may cover a limited angle around the geometric axis AX at the periphery of the hollow body. Indeed, the second flow may come from a fixed direction in relation to the manifold. Therefore, a deflector covering such a limited angle centered substantially around the fixed direction of the second flow in relation to the manifold may be sufficient to ensure that the second flow does not enter the hollow body of the manifold.

In this case, the position of the manifold is indexed in relation to the crankpin. The manifold and the crankpin may therefore comprise an indexing device allowing the manifold to be oriented precisely in the crankpin so that the deflector is positioned relative to the fixed direction of the second flow in relation to the manifold, the limited angle covered by the deflector being, for example, substantially centered on this fixed direction of the second flow in relation to the manifold. The indexing system comprises, for example, a pin arranged on the manifold cooperating with a recess or a notch in the crankpin. Conversely, the crankpin may comprise a pin and the manifold a recess or a notch. Shapes of the hollow body of the manifold and the inside of the crankpin that are asymmetrical about the geometric axis AX and matching may also perform the function of an indexing system.

The deflector may, for example, cover an angle greater than or equal to 100° around the geometric axis AX.

Preferably, the deflector may cover an angle greater than or equal to 270° around the geometric axis AX.

Moreover, the barrier as a whole, i.e., the deflector and the shoulder, may possibly cover such a limited angle around the geometric axis AX at the periphery of the hollow body.

Alternatively, the deflector and the shoulder may cover different limited angles around the geometric axis AX at the periphery of the hollow body. For example, the shoulder covers a first limited angle greater than a second limited angle covered by the deflector.

Alternatively, the barrier as a whole, i.e., the deflector and the shoulder, may cover the whole of the periphery of the hollow body around the geometric axis AX, i.e., an angle of 360° around the geometric axis AX. The barrier is therefore annular in shape. Therefore, the deflector and the shoulder are also annular in shape.

According to another example, the bearing plane is perpendicular to the geometric axis AX. The geometric axis AX is, for example, an axis of symmetry of at least part of the hollow body when it is, for example, at least partially cylindrical with a circular base.

According to another example, the deflector may be parallel to the bearing plane. The deflector comprises, in particular, a face opposite the bearing plane and parallel to this bearing plane.

Alternatively, the deflector may be non-parallel to the bearing plane and thus comprise a face that is inclined in relation to the bearing face. Preferably, the deflection angle between the bearing plane and the deflector may be between 15° and 45° in order to limit the space requirement of the barrier.

However, this deflection angle may be greater than 45°, or indeed greater than or equal to 90°, when the space available above the crankpin permits.

According to another example, the diversion space may be limited in a direction parallel to the geometric axis AX by the deflector and by the bearing plane and radially, in relation to the geometric axis AX, by the shoulder in the direction of the geometric axis AX. The diversion space is open radially towards the outside, moving away from the geometric axis AX.

Alternatively, the diversion space may be limited in a direction parallel to the geometric axis AX by the deflector and by the bearing plane and radially, in relation to the geometric axis AX, by the shoulder and the hollow body in the direction of the geometric axis AX. The diversion space is open radially towards the outside, moving away from the geometric axis AX.

Alternatively, the diversion space may be limited in a direction parallel to the geometric axis AX by the deflector and by the shoulder and/or the bearing plane and radially, in relation to the geometric axis AX, by the hollow body in the direction of the geometric axis AX. The diversion space is open radially towards the outside, moving away from the geometric axis AX.

According to another example, the manifold may comprise a backflow prevention wall for keeping a volume of lubricating liquid in the hollow body. The backflow prevention wall traps some of the lubricating liquid and thus keeps a minimum volume of lubricating liquid in the hollow body depending on the movements and/or accelerations experienced by the manifold. Therefore, the member to be lubricated and/or to be cooled may be constantly supplied with lubricating liquid.

The backflow prevention wall is connected to the hollow body. The backflow prevention wall may, for example, be arranged inside the hollow body and connected to an inner wall of the hollow body.

The backflow prevention wall may be annular in shape and centered on the geometric axis AX. The inlet port is then formed by an opening at the center of the backflow prevention wall.

The backflow prevention wall may be connected to an inner wall of the hollow body and the inlet port is then formed by an opening between the backflow prevention wall and a wall of the hollow body. The backflow prevention wall is thus asymmetrical around the geometric axis AX. The position of the manifold may then be indexed in relation to the crankpin in order to effectively keep the minimum volume of lubricating liquid in the hollow body depending on the movements and/or accelerations experienced by the manifold. The manifold and the crankpin may comprise an indexing device, as mentioned previously, allowing the manifold to be oriented precisely in the crankpin.

According to another example, the hollow body may comprise deformation openings in the form of slots arranged on a wall of the hollow body between the inlet port and the outlet port, the manifold comprising at least one fastening support configured to fasten the manifold to the crankpin by means of at least one fastening device. Said at least one fastening support is connected to the hollow body. The dimensions of the manifold are determined such that, by fastening the manifold to the crankpin by means of at least one fastening support and at least one fastening device, the hollow body is deformed and grows longer by virtue of the deformation openings such that the bearing face of the shoulder of the barrier applies pressure to an outer face of the crankpin or an outer face of a support carrying the crankpin. This pressure helps produce a tight seal between the manifold, and in particular its barrier, and the crankpin or the support carrying the crankpin, in order at the very least to prevent foreign particles contained in the second flow of the lubricating liquid from penetrating into the crankpin, or indeed to prevent this second flow from penetrating into the crankpin.

The deformation openings must be non-parallel to the geometric axis AX in order to contribute to the tensile deformation of the hollow body along the geometric axis AX. The slots may, for example, be arranged in planes perpendicular to the geometric axis AX.

According to another example, a lubricating liquid manifold according to the disclosure may be attached to the planet carrier at each crankpin.

Alternatively, a lubricating liquid manifold according to the disclosure may be integrated with the planet carrier at each crankpin, as such forming one and the same part.

The present disclosure also relates to an epicyclic gear train comprising a planet carrier and several toothed planet gears carried by the planet carrier, the planet carrier comprising a support and several crankpins carried by the support, each planet gear having teeth arranged around a crankpin, the epicyclic gear train comprising such manifolds and rotational guide devices for guiding the rotation of the planet gears in relation to the crankpins. The crankpins and the support may form one and the same part.

The bearing face of each manifold may bear against an outer face of the support or an outer face of one of the crankpins.

The geometric axis AX of each manifold may coincide with an axis of revolution AXM of the crankpin in which the manifold is arranged.

Furthermore, when the deflector of each manifold covers an angle strictly less than 360° around the geometric axis AX, each manifold may be arranged in a crankpin such that the deflector covers an angle greater than or equal to 50° to either side of a line connecting the geometric axis AX and a first axis of rotation AXROT1 of the planet carrier.

The present disclosure also relates to a gearbox comprising such an epicyclic gear train and a lubrication system.

The gearbox may comprise a frame and a main guide device arranged between the frame and the planet carrier, the frame comprising a duct through which the first flow of the lubricating liquid is conveyed towards the manifolds during rotation of the planet carrier.

The lubrication system distributes the first flow and a second flow of lubricating liquid to the epicyclic gear train, the first flow being conveyed to the manifolds via the duct and the second flow being conveyed to the main guide device.

The present disclosure finally relates to an aircraft comprising a gearbox as described previously.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
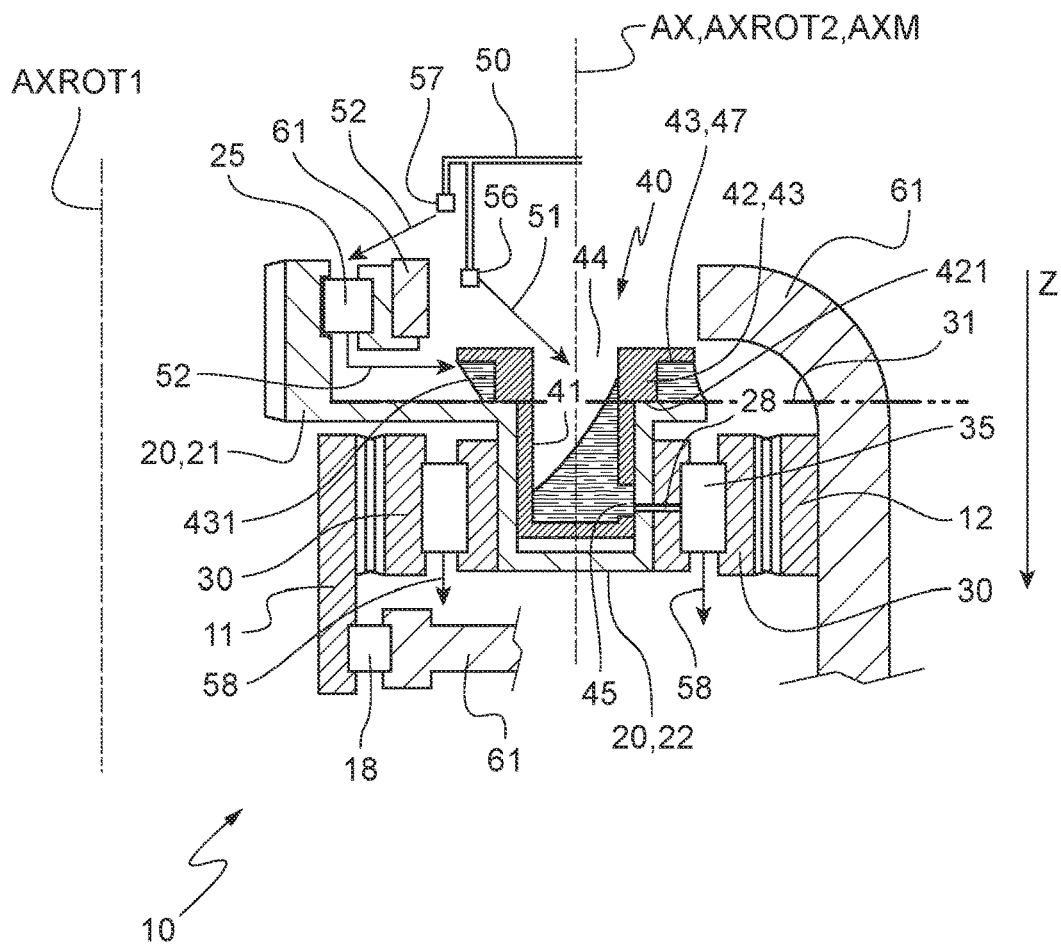
FIG. 1 is a cross-sectional view of an epicyclic gear train provided with a manifold according to the disclosure.

FIG. 1 shows an epicyclic gear train 10 that makes it possible to achieve a high rotational speed reduction ratio between an input shaft and an output shaft.

Such an epicyclic gear train 10 may be arranged in a gearbox 6 also comprising a lubrication system 50 intended to lubricate and/or to cool the rotating elements of the gearbox 6 by using a lubricating liquid such as oil, for example. The gearbox 6 thus constitutes a lubricated mechanical system.

Figure 2:
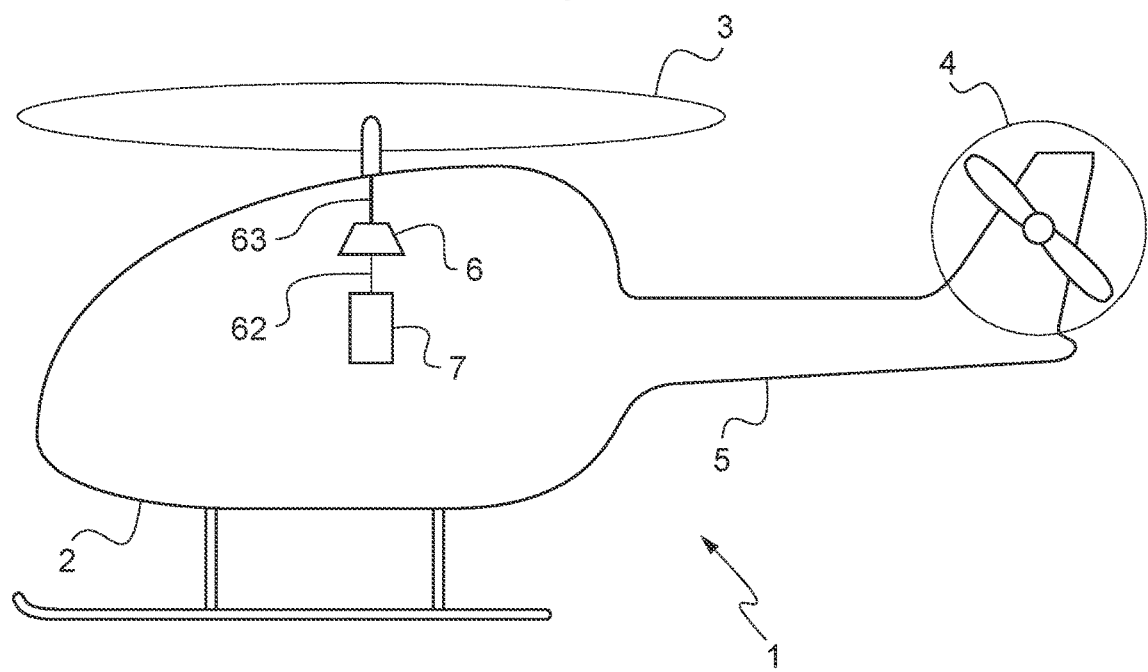
FIG. 2 is a schematic side view of an aircraft.

Such an epicyclic gear train 10 may be arranged in a gearbox 6 of a rotary-wing aircraft 1 such as a rotorcraft shown in FIG. 2. This aircraft 1 may comprise a fuselage 2, a main rotor 3 providing at least partial lift for the aircraft 1 and, possibly, an auxiliary rotor 4 arranged at the end of a tail boom 5. The gearbox 6 is rotated by a power plant 7 provided with at least one engine and rotates the main rotor 3 and, possibly, the auxiliary rotor 4.

For example, and in this context, the gearbox 6 comprises at least one input shaft 62 connected to the power plant 7 and one output shaft 63 connected to the main rotor 3. An output shaft (not shown) of the gearbox 6 may also be connected to the auxiliary rotor 4.

Such an epicyclic gear train 10 may alternatively be arranged in other lubricated mechanical systems.

The epicyclic gear train 10 comprises a toothed sun gear 11, a toothed outer ring gear 12, a planet carrier 20 and several toothed planet gears 30 carried by the planet carrier 20.

The cutting plane of FIG. 1 passes through a first axis of rotation AXROT1 of the planet carrier 20 and through a second axis of rotation AXROT2 of a planet gear 30, the first axis of rotation AXROT1 and the second axis of rotation AXROT2 being parallel.

The planet carrier 20 may, for example, be secured to the output shaft 63 and the sun gear 11 may be secured to the input shaft 62 or indeed be secured to an intermediate shaft connected to the input shaft 62 by pinions and gears. According to this example, the outer ring gear 12 is fixed in relation to the gearbox 6 and secured to a frame 61 of the gearbox 6.

The planet carrier 20 comprises a support 21 and several crankpins 22 carried by the support 21. The planet carrier 20 is guided in rotation in relation to the frame 61 about the first axis of rotation AXROT1 by a main guide device 25. Each planet gear 30 is arranged at least partially around a crankpin 22, an axis of revolution AXM of each crankpin 22 coinciding with the second axis of rotation AXROT2. Each planet gear 30 is guided in rotation about the second axis of rotation AXROT2 by a guide device 35. The sun gear 11 is guided in rotation in relation to the frame 61 by another guide device 18. Each guide device 18, 25, 35 may comprise a plain bearing or one or more bearings with rolling elements, such as ball bearings, roller bearings or indeed needle bearings, for example.

The sun gear 11 and the planet carrier 20 are arranged, according to this example, so as to be able to rotate about the first axis of rotation AXROT1. Moreover, the sun gear 11, the outer ring gear 12 and the planet carrier 20 are coaxial along the first axis of rotation AXROT1. Each planet gear 30 comprises teeth cooperating with teeth of the outer ring gear 12 and teeth of the sun gear 11. When the aircraft 1 is standing on level ground, the first axis of rotation AXROT1 may be oriented substantially vertically in a terrestrial reference frame, i.e., parallel to the direction Z of the Earth's gravity.

Regardless of the implementation of the epicyclic gear train 10, the function of the lubrication system 50 is, in particular, to lubricate the epicyclic gear train 10. In particular, the lubrication system 50 lubricates the guide devices 35 by injecting a first flow 51 of the lubricating liquid and the main guide device 25 by injecting a second flow 52 of the lubricating liquid.

The epicyclic gear train 10 also comprises manifolds 40 according to the disclosure, one manifold 40 being arranged in each crankpin 22.

Irrespective of the nature of the mechanical system provided with such a manifold 40, the manifold 40 comprises a hollow body 41 provided with an inlet port 44 and an outlet port 45. The manifold 40 comprises a barrier 43 provided with a shoulder 42 and a deflector 47. The deflector 47 is situated on an opposite side to the outlet port 45 in relation to a bearing plane 31, and is arranged protruding radially outwards from the hollow body 41, at least locally, with respect to the geometric axis AX, moving away from this geometric axis AX. The barrier 43 delimits a diversion space 431 situated between the deflector 47 and the bearing plane 31.

The hollow body 41 extends around a geometric axis AX which may coincide with the axis of revolution AXM of the crankpin 22 and/or with the second axis of rotation AXROT2 during use. The hollow body 41 may, for example, be cylindrical and the space inside the hollow body 41 may also be cylindrical.

The inlet port 44 is intended to receive the first flow 51 of the lubricating liquid originating, for example, from a first spraying point 56, as shown in FIG. 2. The first flow 51 may also be conveyed, by force of gravity, towards the inlet port 44 of the manifold 40.

The first flow 51 of the lubricating liquid may penetrate into the manifold 40 and be conveyed, for example by force of the Earth's gravity and/or a centrifugal force generated by the rotation of the crankpin 22 about the first axis of rotation AXROT1, via the outlet port 45 and one or more radial ports 28 present in the crankpin 22, towards the guide device 35 connected to the crankpin 22. Next, the lubricating liquid flows, after having passed through the guide device 35, towards a tank, for example, in the form of a first return flow 58.

Moreover, the shoulder 42 is connected to the body 41 and is provided with a bearing face 421. This bearing face 421 bears on an outer face of the support 21 or an outer face of the crankpin 22. This bearing face 421 extends in a bearing plane 31 which is, for example, perpendicular to the geometric axis AX. According to the epicyclic gear train 10 shown in FIG. 1, the crankpins 22 and the support 21 form one and the same part. Alternatively, the crankpins 22 and the support 21 may be separate parts.

According to the example of a manifold 40 shown in FIG. 1, the deflector 47 protrudes radially outwards from the body 41 and the shoulder 42, moving away from the geometric axis AX. According to this example, the deflector 47 is connected to the shoulder 42. When the body 41, the deflector 47 and the shoulder 42 are cylindrical with a circular base, the deflector 47 has an external diameter greater than the external diameter of the shoulder 42 which is itself greater than the external diameter of the body 41.

The diversion space 431 of this manifold 40 is thus closed parallel to the geometric axis AX by the deflector 47 and the outer face of the support 21 and/or the outer face of the crankpin 22 present in the bearing plane 31, and radially by the shoulder 42. This diversion space 431 is open radially towards the outside, moving away from the geometric axis AX.

This diversion space 431 thus receives the second flow 52 of the lubricating liquid, this second flow 52 having passed, for example, through the main guide device 25 after having been distributed by a second spraying point 57. The first flow 51 and the second flow 52 of the lubricating liquid are therefore separate. The barrier 43 diverts this second flow 52, preventing this second flow 52 from entering the hollow body 41. The lubricating liquid may then flow towards a tank, for example, in the form of a second return flow, without having entered the crankpin 22, or having passed through the guide device 35.

The guide device 35 has therefore been lubricated only by the first flow 51, which is clean because it originates directly from the first spraying point 56. The second flow 52, which has possibly been polluted with foreign particles, for example metal particles, when passing through the main guide device 25, is thus discharged without the risk of passing through another guide device, for example.

Figure 3:
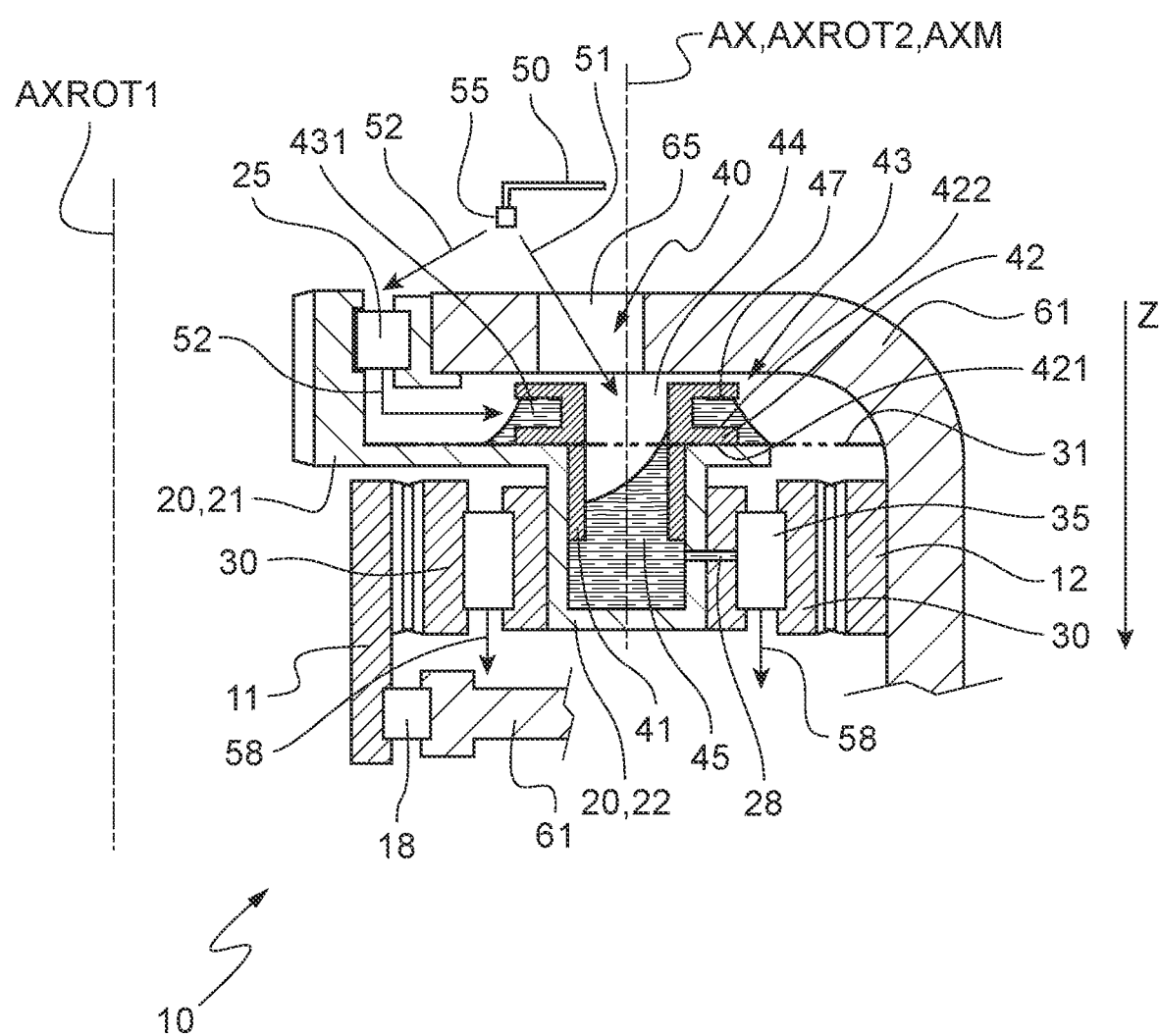
FIG. 3 is a cross-sectional view of an epicyclic gear train provided with a manifold according to the disclosure.

FIG. 3 shows another example of an epicyclic gear train 10 suitable for equipping a gearbox 6. According to this example, the first flow 51 and the second flow 52 of the lubricating liquid may be distributed by the same spraying device 55 of the lubrication system 50. In this case, the spraying device 55 is positioned above the frame 61 so as to be able to convey the second flow 52 of the lubricating liquid towards the main guide device 25.

The term "above" should be understood, like the terms "under" and "below", in relation to the first axis of rotation AXROT1 of the epicyclic gear train 10 oriented from the main guide device 25 towards the other guide device 18. This first axis of rotation AXROT1 may, for example, be substantially parallel to the direction Z of the Earth's gravity when the aircraft 1 is standing normally on horizontal ground on its landing gears. Similarly, the term "vertical" means along this first axis of rotation AXROT1, i.e., substantially parallel to the direction Z of the Earth's gravity when this aircraft 1 is standing normally on the ground. Moreover, the terms "upper" and "lower" should also be understood in relation to this first axis of rotation AXROT1 oriented from the main guide device 25 towards the other guide device 18.

One or more ducts 65 pass through the frame 61 substantially vertically between the spraying device 55 and each crankpin 22 in order to convey the first flow 51 towards a manifold 40 during rotation of the planet carrier 20.

The first flow 51 of the lubricating liquid may thus enter the hollow body 41 of the manifold 40 through the inlet port 44 and accumulate there before being conveyed, via the outlet port 45 and one or more radial ports 28 present in the crankpin 22, towards the guide device 35 connected to the crankpin 22. Next, the lubricating liquid flows, after having passed through the guide device 35, towards a tank, for example, in the form of a first return flow 58.

According to this example, the deflector 47 of the manifold 40 protrudes radially outwards from the body 41, but has the same diameter as the shoulder 42. The body 41 extends beyond and above the shoulder 42 along the geometric axis AX, up to the deflector 47. According to this example, the deflector 47 is connected to the body 41. The barrier 43 thus comprises a groove delimited by the deflector 47 and the shoulder 42, the bottom of this groove being formed by the body 41.

The diversion space 431 of this manifold 40 is thus closed parallel to the geometric axis AX by the deflector 47 and by an upper face 422 of the shoulder 42. This diversion space 431 is closed radially by the part of the body 41 extending above the shoulder 42, outside the crankpin 22, and is open radially towards the outside, moving away from the geometric axis AX.

As previously, the diversion space 431 receives the second flow 52 of the lubricating liquid and the deflector 47 prevents this second flow 52 from entering the hollow body 41. The barrier 43 once again diverts this second flow 52 until the lubricating liquid flows towards a tank, for example, in the form of a second return flow, without having entered the crankpin 22, or having passed through the guide device 35.

Figure 4:
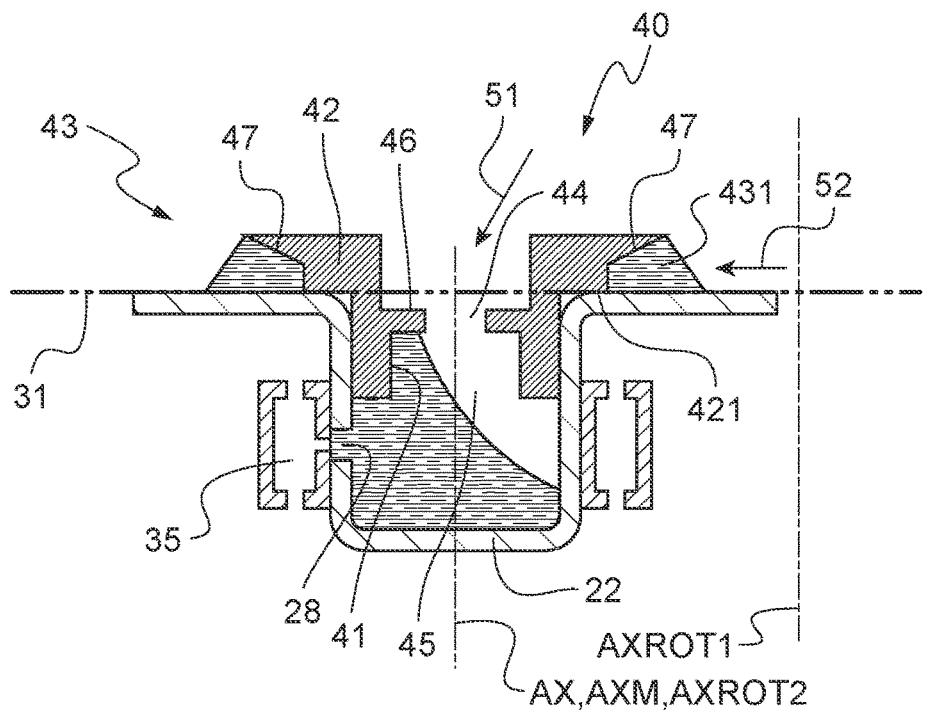
FIGS. 4 to 6 are cross-sectional views of a crankpin and a manifold according to the disclosure.

Another example of a manifold 40 is shown in FIG. 4. Only the manifold 44, the crankpin 22 and the guide device 35 are shown in FIG. 4 and the subsequent figures, in order to keep these figures simple.

According to this example of a manifold 40, the deflector 47 protrudes radially outwards from the body 41 and the shoulder 42. According to this example, the deflector 47 is connected to the shoulder 42. The deflector 47 is inclined in relation to the bearing plane 31. The deflector is therefore non-parallel to the bearing plane 31, and forms a deflection angle with the bearing plane 31, for example of between 15° and 45°. The deflector 47 may be inclined in relation to the bearing plane 31, regardless of the other features of the manifold 40. The deflector 47 may in particular be inclined in relation to the bearing plane 31 in the examples of manifolds 40 described previously.

The diversion space 431 of this manifold 40 is thus closed parallel to the geometric axis AX by the deflector 47 and by the outer face of the support 21 and/or the outer face of the crankpin 22 present in the bearing plane 31, as well as radially by the shoulder 42. This diversion space 431 is open radially towards the outside, moving away from the geometric axis AX.

As previously, the diversion space 431 receives the second flow 52 of the lubricating liquid and the deflector 47 prevents this second flow 52 from entering the hollow body 41. The barrier 43 once again diverts this second flow 52 until it flows towards a tank, for example, without having entered the crankpin 22, or having passed through the guide device 35.

Moreover, this manifold 40 may comprise, inside the hollow body 41, a backflow prevention wall 46 for keeping a volume of the lubricating liquid in the hollow body 41. A backflow prevention wall 46 may be arranged on the manifold 40, regardless of the other features of the manifold 40. Such a backflow prevention wall 46 may in particular be integrated with the examples of manifolds 40 described previously. According to this example, the backflow prevention wall 46 is annular, centered on the geometric axis AX and connected to an inner wall of the body 41. An opening at the center of the backflow prevention wall 46 constitutes the inlet port 44 of the manifold 40.

The backflow prevention wall 46 makes it possible to prevent, or at the very least to limit, a backflow of lubricating liquid under the effect of a centrifugal force generated by the rotation of the planet carrier 20 about the first axis of rotation AXROT1. A minimum volume of the lubricating liquid is thus kept in the hollow body 41 in order to convey a sufficient quantity of lubricating liquid to the guide device 35 via the outlet port 45 and the radial port or ports 28.

Figure 5:
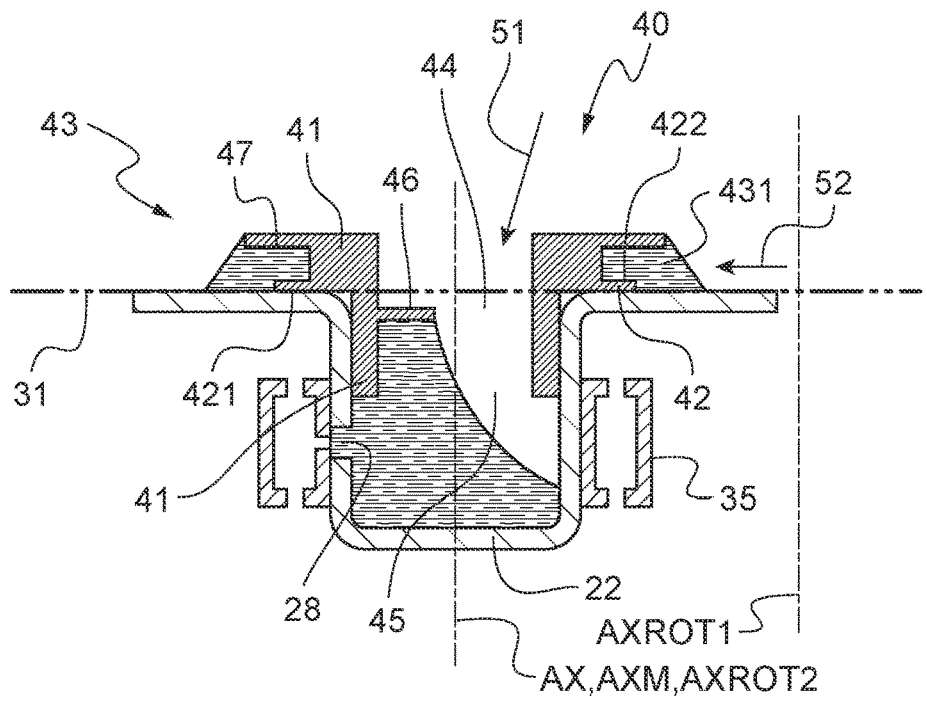

FIG. 5 shows another example of a manifold 40 in which the deflector 47 protrudes radially outwards from the body 41 and the shoulder 42. According to this example, the deflector 47 is connected to the body 41. The external diameter of the deflector 47 is, in this example, greater than the external diameters of the body 41 and the shoulder 42. According to this example, the deflector 47 is parallel to the bearing plane 31.

Figure 6:
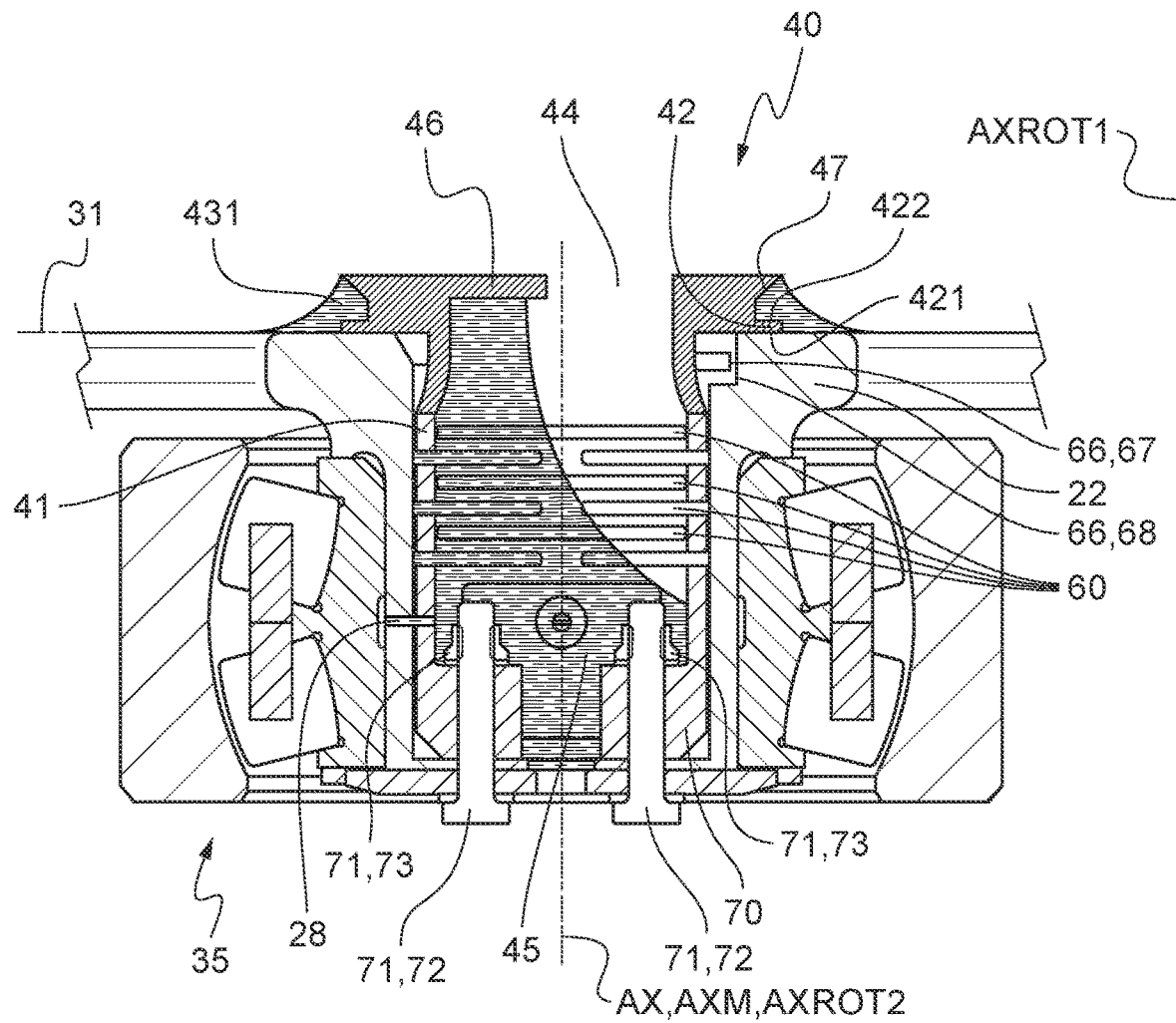

FIG. 6 shows another example of a manifold 40 in which the deflector 47 protrudes radially outwards from the body 41 and the shoulder 42. According to this example, the deflector 47 is connected to the body 41. The external diameter of the deflector 47 is, in this example, greater than the external diameters of the body 41 and the shoulder 42. According to this example, the deflector 47 is non-parallel to the bearing plane 31 and is therefore inclined in relation to the bearing plane 31.

In both of these two examples of FIGS. 5 and 6, the body 41 extends beyond and above the shoulder 42 along the geometric axis AX, up to the deflector 47. The outer surface of the body 41 situated outside the crankpin 22 has a diameter greater than the outer surface of the body 41 positioned inside the crankpin 22. The barrier 43 thus comprises a groove delimited by the deflector 47 and the upper face 422 of the shoulder 42, the bottom of this groove being formed by the body 41.

The diversion space 431 for these two latter examples is thus closed parallel to the geometric axis AX by the deflector 47 and by an upper face 422 of the shoulder 42 and by the outer face of the support 21 and/or the outer face of the crankpin 22 present in the bearing plane 31. This diversion space 431 is closed radially by the part of the body 41 extending beyond the shoulder 42, outside the crankpin 22, and is open radially towards the outside, moving away from the geometric axis AX.

In both of these two final examples of a manifold 40 and as previously, the diversion space 431 receives the second flow 52 of the lubricating liquid and the deflector 47 prevents this second flow 52 from entering the hollow body 41. The barrier 43 once again allows this second flow 52 to be diverted until it flows towards a tank, for example, without having entered the crankpin 22, or having passed through the guide device 35.

The manifolds 40 according to these two final examples may also comprise a backflow prevention wall 46 connected to an inner wall of the hollow body 41. The backflow prevention wall 46 is asymmetrical around the geometric axis AX and the inlet port 44 is formed by an opening between the backflow prevention wall 46 and the inner wall of the hollow body 41. The backflow prevention wall 46 is positioned in relation to the geometric axis AX on the opposite side to the direction of arrival of the second flow 52 in the manifold 40.

The position of the manifold 40 must therefore be indexed in relation to the crankpin 22 in order to keep the position of the backflow prevention wall 46 opposite the direction of arrival of the second flow 52 in the manifold 40 in relation to the geometric axis AX. To this end, the manifold 40 and the crankpin 22 may comprise an indexing device 66 allowing the manifold 40 to be oriented precisely in the crankpin 22. The indexing device 66 is provided with a pin 67 arranged on the manifold 40 and a recess 68 arranged in the crankpin 22. Alternatively, a pin 67 may also be arranged on the crankpin 22, the manifold 40 comprising a recess 68.

Irrespective of the other features of the manifold 40, the backflow prevention wall 46 may be arranged parallel to the bearing plane 31 as shown in FIGS. 4 to 6. Alternatively, the backflow prevention wall 46 may be inclined in relation to the bearing plane 31 and therefore non-parallel to the bearing plane 31.

The backflow prevention wall 46 may, for example, be arranged inside the hollow body 41, as shown in FIG. 5. The backflow prevention wall 46 may also be arranged at one end of the hollow body 41, as shown in FIG. 6.

The backflow prevention wall 46 helps keep a minimum volume of lubricating liquid in the manifold 40 and the crankpin 22, regardless of the movements of the planet carrier 20.

Moreover, irrespective of the other features of the manifold 40, the hollow body 41 may comprise, as shown in FIG. 6, deformation openings 60 in the form of slots arranged between the inlet port 44 and the outlet port 45. The manifold 40 also comprises at least one fastening support 70 connected to the body 41 and arranged below the body 41. Each fastening support 70 allows the manifold 40 to be fastened to the crankpin 22 by means of at least one fastening device 71, for example comprising a screw 72 and a nut 73. The deformation openings 60 are, for example, arranged perpendicular to the geometric axis AX.

Therefore, when the manifold 40 is fastened to the crankpin 22 by means of the fastening support 70 and at least one fastening device 71, the manifold 40 may be deformed under tension along the geometric axis AX by virtue of the presence of the deformation openings 60. As a result, the bearing face 421 of the shoulder 42 applies pressure to the outer face of the crankpin 22 and/or the outer face of the crankpin 22, ensuring a sufficiently tight seal between the manifold 40 and the crankpin 20 or the support 20 so that no foreign particle contained in the second flow 52 penetrates into the crankpin 22, or indeed so that this second flow 52 does not penetrate into the crankpin 22.

Figure 7:
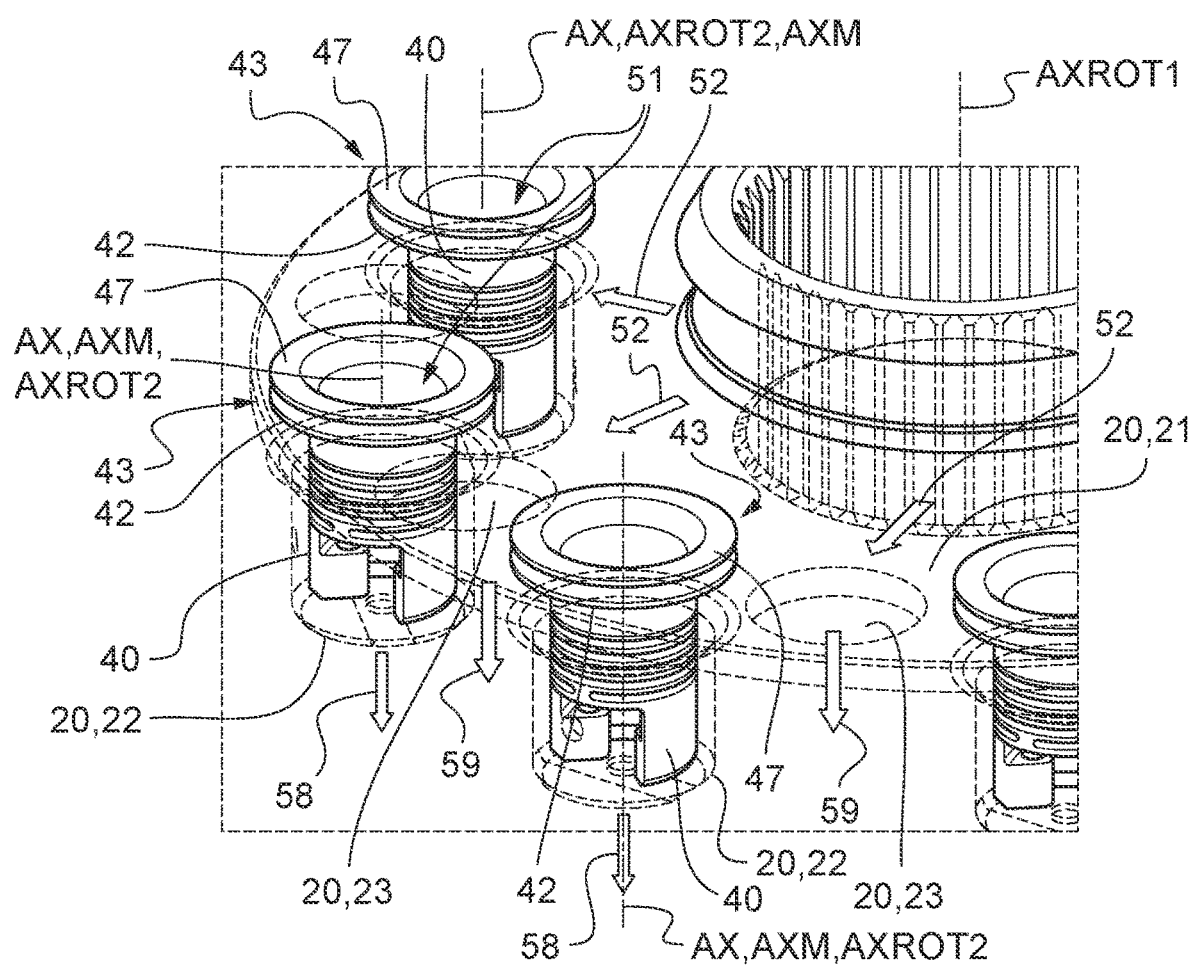
FIGS. 7 to 8 are two perspective views of a planet carrier carrying manifolds.

FIG. 7 shows a partial perspective view of a planet carrier 20 carrying manifolds 40. The first flow 51 and the second flow 52 are shown. The first flow 51 is conveyed towards each manifold 40 and then flows, after having passed through the guide device 35 (not shown), towards a tank, for example, in the form of the first return flow 58. The second flow 52 circulates over the support 21 of the planet carrier 20, after having passed through the main guide device 25 (not shown), up to the manifold 40. The barrier 43 diverts this second flow 52, which may flow through holes 23 in the support 21 towards a tank, for example, in the form of the second return flow 59, without having entered the crankpin 22, or having passed through the guide device 35 (not shown). The deflector 47 of each manifold 40 is arranged around the entire periphery of the manifold 40 according to the example shown. Therefore, the deflector 47 and the shoulder 42, as well as the barrier 43, are annular in shape.

Figure 8:
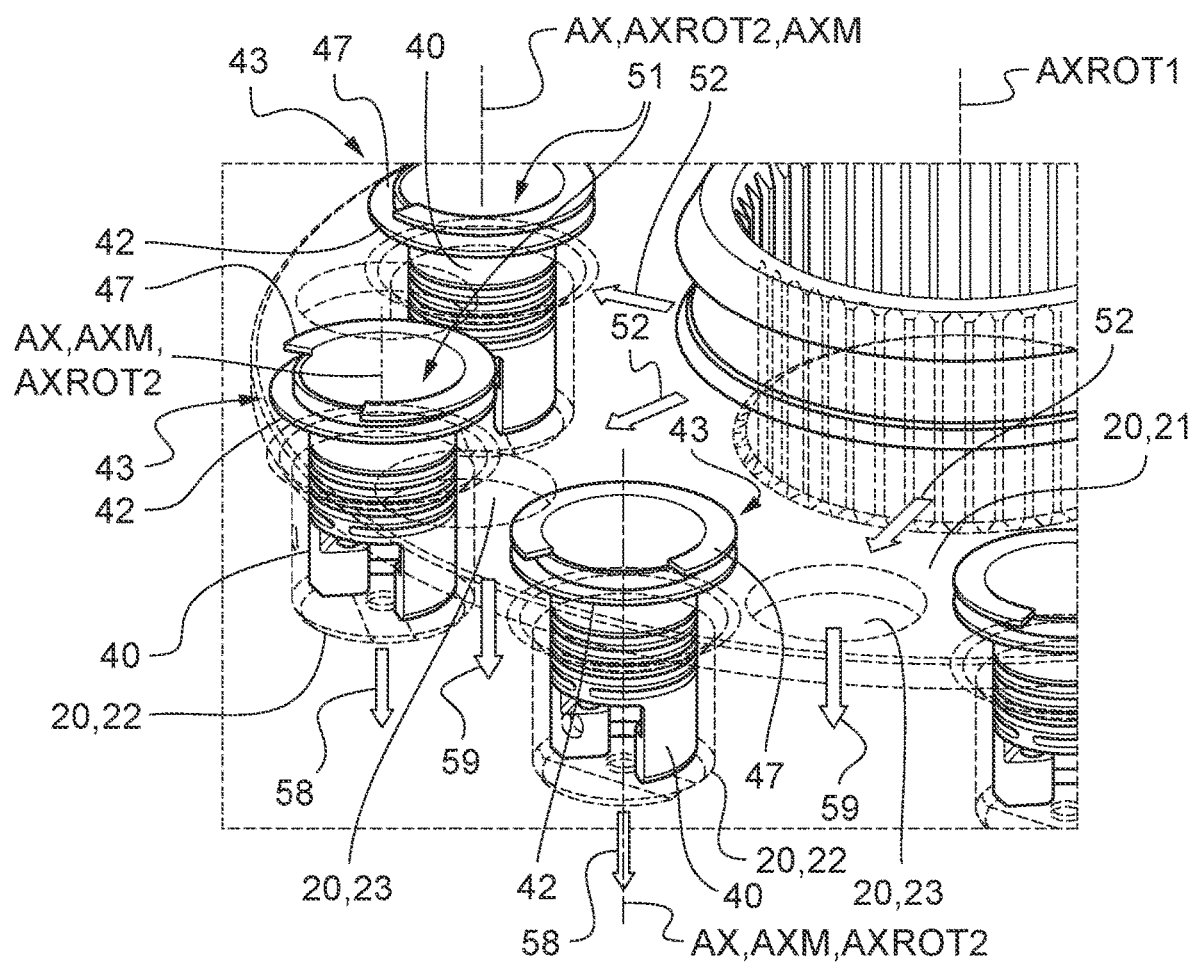

FIG. 8 shows a partial perspective view of a planet carrier 20 carrying other manifolds 40. For each manifold 40, the deflector 47 covers an angle greater than or equal to 100° around the geometric axis AX, for example equal to 270° around the geometric axis AX according to the example shown. The deflector 47 of each manifold 40 is centered substantially around a direction connecting the first axis of rotation AXROT1 and the geometric axis AX of this manifold 40, for example by means of an indexing device 60.

Moreover, the manifolds 40 may be integrated with the planet carrier 20 at each crankpin 22, thus forming a single part.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. A lubricating liquid manifold for a crankpin, the crankpin being configured to carry a rotational guide device, the manifold being configured to receive a first flow and a second flow of a lubricating liquid, the first flow and the second flow being separate,
wherein the manifold comprises:
a hollow body around a geometric axis and provided with:
an inlet port configured to receive the first flow of the lubricating liquid; and
an outlet port configured such that the first flow is conveyed towards the guide device connected to the crankpin,
a barrier configured to divert the second flow of the lubricating liquid, the barrier comprising:
a shoulder connected to the body and provided with a bearing face, the bearing face extending in a bearing plane;
a deflector situated on an opposite side to the outlet port in relation to the bearing plane, the deflector protruding radially outwards from the body, locally, moving away from the geometric axis; and
a diversion space for diverting the second flow situated between the deflector and the bearing plane.

2. The manifold according to claim 1,
wherein the deflector covers an angle greater than or equal to 100° around the geometric axis.

3. The manifold according to claim 1,
wherein the deflector covers an angle greater than or equal to 270° around the geometric axis.

4. The manifold according to claim 1,
wherein the bearing plane is perpendicular to the geometric axis.

5. The manifold according to claim 1,
wherein the deflector is parallel to the bearing plane.

6. The manifold according to claim 1,
wherein the deflector is inclined in relation to the bearing plane.

7. The manifold according to claim 1,
wherein the diversion space is limited in a direction parallel to the geometric axis by the deflector and by the bearing plane and radially by the shoulder in the direction of the geometric axis, the diversion space being open radially towards the outside, moving away from the geometric axis.

8. The manifold according to claim 1,
wherein the diversion space is limited in a direction parallel to the geometric axis by the deflector and by the shoulder and radially by the shoulder and/or the body in the direction of the geometric axis, the diversion space being open radially towards the outside, moving away from the geometric axis.

9. The manifold according to claim 1,
wherein the manifold comprises a backflow prevention wall for keeping a volume of the lubricating liquid in the hollow body.

10. The manifold according to claim 1,
wherein the hollow body comprises deformation openings in the form of slots arranged between the inlet port and the outlet port, the manifold comprising at least one fastening support configured to fasten the manifold to the crankpin by means of at least one fastening device.

11. An epicyclic gear train comprising a planet carrier and several toothed planet gears carried by the planet carrier, the planet carrier comprising a support and several crankpins carried by the support, each planet gear having teeth arranged around a crankpin, the epicyclic gear train comprising rotational guide devices for guiding the rotation of the planet gears in relation to the crankpins,
wherein the epicyclic gear train comprises a manifold according to claim 1 arranged in each crankpin, the bearing face of each manifold bearing on an outer face of the support or an outer face of the crankpin in which the manifold is arranged.

12. The epicyclic gear train according to claim 11,
wherein the deflector of each manifold covering an angle strictly less than 360° around the geometric axis, each manifold is arranged in a crankpin such that the deflector covers an angle greater than or equal to 50° to either side of a line connecting the geometric axis and an axis of rotation of the planet carrier.

13. A gearbox comprising an epicyclic gear train and a lubrication system,
wherein the epicyclic gear train comprises the epicyclic gear train of claim 11.

14. The gearbox according to claim 13,
wherein the gearbox comprises a frame, the frame comprising a duct through which the first flow of the lubricating liquid is conveyed towards the manifolds during rotation of the planet carrier.

15. An aircraft,
wherein that the aircraft comprises a gearbox according to claim 13.

* * * * *